(12) United States Patent
Hsu et al.

(10) Patent No.: US 7,100,863 B2
(45) Date of Patent: Sep. 5, 2006

(54) FLOATING LINER

(75) Inventors: Christopher Hsu, Mentor, OH (US); David J. Barton, Twinsburg, OH (US); Michael A. Carroscia, Newbury, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

(21) Appl. No.: 10/736,861

(22) Filed: Dec. 16, 2003

(65) Prior Publication Data

US 2005/0127233 A1 Jun. 16, 2005

(51) Int. Cl.
*B65H 23/00* (2006.01)

(52) U.S. Cl. .................. 242/566; 242/132; 242/137.1; 242/146; 206/408; 206/409

(58) Field of Classification Search ............... 242/566, 242/593, 132, 137, 137.1, 138, 146, 588.3
See application file for complete search history.

(56) References Cited

U.S. PATENT DOCUMENTS

| 2,229,787 | A | * | 1/1941 | Abbott | 242/557 |
|---|---|---|---|---|---|
| 2,319,828 | A | * | 5/1943 | Rohweder | 242/128 |
| 2,322,607 | A | * | 6/1943 | Wald | 242/593 |
| 2,457,094 | A | | 12/1948 | Smith | |
| 2,821,092 | A | * | 1/1958 | Cordora et al. | 74/502.5 |
| 2,849,195 | A | | 8/1958 | Richardson et al. | |
| 2,864,565 | A | | 12/1958 | Whearley | |
| 2,895,210 | A | | 7/1959 | Hubbard | |
| 2,950,876 | A | | 8/1960 | McLoughlin | |
| 2,966,258 | A | | 12/1960 | Krafft et al. | |
| 3,013,742 | A | | 12/1961 | Bittman | |
| 3,061,235 | A | * | 10/1962 | Lingle | 242/128 |
| 3,076,619 | A | | 2/1963 | Nye et al. | |
| 3,082,868 | A | | 3/1963 | Hubbard | |
| 3,113,745 | A | | 12/1963 | Bittman | |
| 3,168,259 | A | | 2/1965 | Cady | |
| 3,272,455 | A | | 9/1966 | Sternberg et al. | |
| 3,700,185 | A | | 10/1972 | Hubbard et al. | |
| 3,815,844 | A | * | 6/1974 | Wright et al. | 242/128 |
| 3,863,861 | A | | 2/1975 | Bellasio | |
| 4,009,845 | A | * | 3/1977 | Santucci et al. | 242/129.7 |
| 4,111,380 | A | * | 9/1978 | Heuckroth | 242/128 |
| 4,274,607 | A | * | 6/1981 | Priest | 242/163 |

(Continued)

FOREIGN PATENT DOCUMENTS

FR 2661118 A1 * 10/1991

*Primary Examiner*—John Q. Nguyen
*Assistant Examiner*—Sang Kim
(74) *Attorney, Agent, or Firm*—Fay Sharpe Fagan Minnich & McKee, LLP; Brian E. Turung

(57) ABSTRACT

A floating liner for a container of welding wire which floating liner includes a tube having two ends and a passageway extending between the two ends. The floating liner is unsupported between the top of the container and the retaining ring. The floating liner is designed to provide structural support to the wire and added stiffness or rigidity to the wire to inhibit buckling of the wire, knot formation in the wire that can form between the retaining ring and the top of the container. The floating liner has a weight profile that causes one end of the tube to at least partially float above the top surface of a layer of welding wire or retaining ring in the container as the welding wire is paid out of the container.

72 Claims, 6 Drawing Sheets

U.S. PATENT DOCUMENTS

| | | | |
|---|---|---|---|
| 4,350,311 A | 9/1982 | Pokhodnya et al. | |
| 4,508,291 A | 4/1985 | Kosch | |
| 4,553,707 A | 11/1985 | Henrich | |
| 4,763,854 A | 8/1988 | Borowski | |
| 4,869,367 A | 9/1989 | Kawasaki | |
| 4,869,438 A | 9/1989 | Braun et al. | |
| 5,007,597 A * | 4/1991 | Jones | 242/420.6 |
| 5,105,943 A | 4/1992 | Lesko | |
| 5,277,314 A | 1/1994 | Cooper | |
| 5,494,160 A | 2/1996 | Gelmetti | |
| 5,657,935 A * | 8/1997 | Cooper | 242/128 |
| 5,746,380 A | 5/1998 | Chung | |
| 5,758,834 A | 6/1998 | Dragoo | |
| 5,819,934 A | 10/1998 | Cooper | |
| 5,896,654 A * | 4/1999 | Moll et al. | 29/860 |
| 5,897,071 A | 4/1999 | Hauck et al. | |
| 5,971,308 A * | 10/1999 | Boulton | 242/131 |
| 6,019,303 A | 2/2000 | Cooper | |
| 6,237,768 B1 | 5/2001 | Cipriani | |
| 6,257,517 B1 * | 7/2001 | Babish et al. | 242/365.6 |
| 6,260,781 B1 | 7/2001 | Cooper | |
| 6,386,364 B1 | 5/2002 | Kawasaki | |
| 6,481,575 B1 | 11/2002 | Cipriani | |
| 2003/0192802 A1 * | 10/2003 | Dragoo et al. | 206/408 |

* cited by examiner

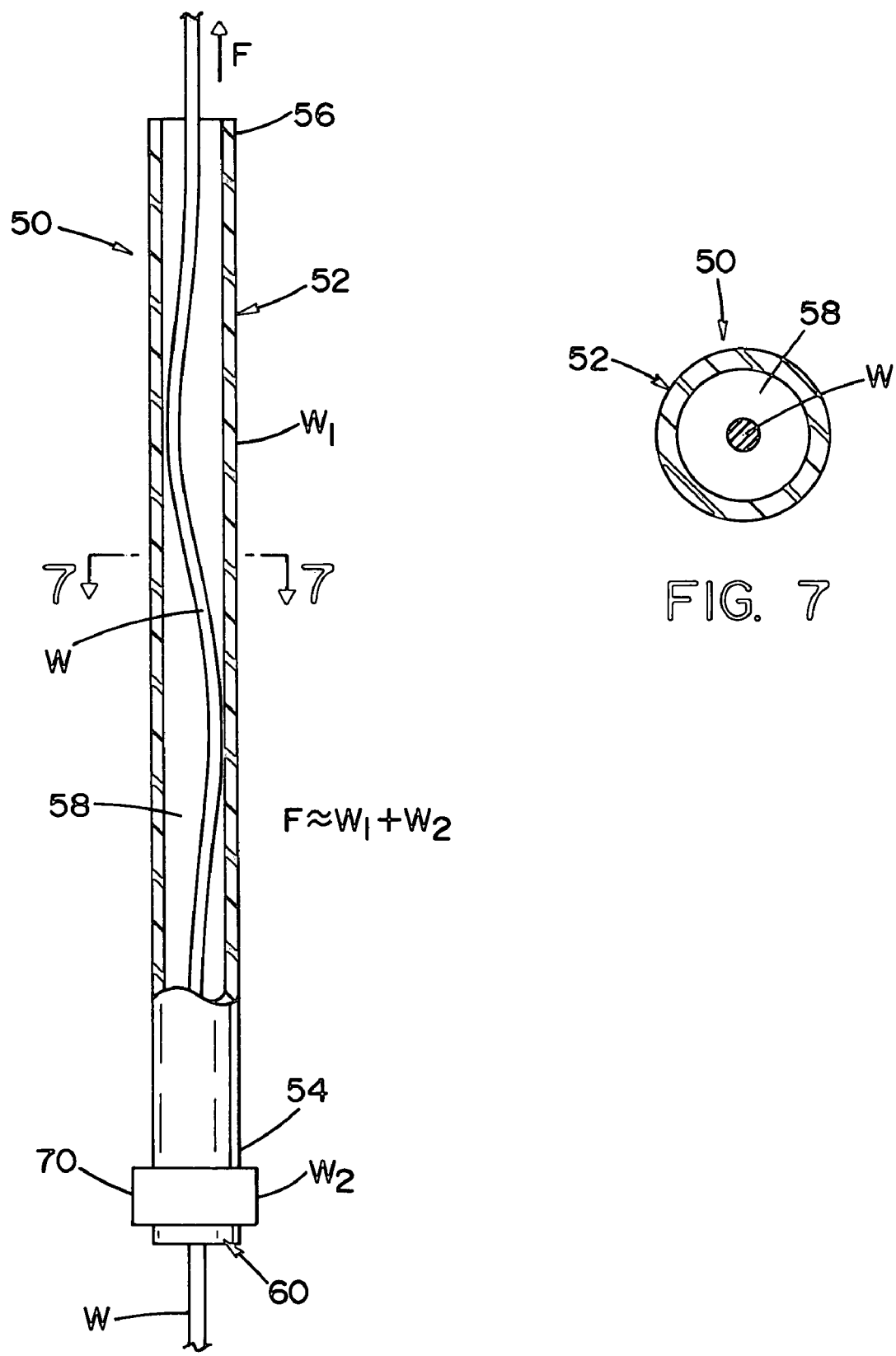

FLOATING LINER

The invention relates to the art of feeding welding wire from a bulk storage container, and particularly to an improved container for wire, and more particularly liner for a welding wire container that enhances the payout of the welding wire from the container for mass production welding.

INCORPORATION BY REFERENCE

Incorporated by reference is Cooper U.S. Pat. No. 5,277,314 and Dragoo U.S. Pat. No. 5,758,834 which disclose bulk storage containers that can be used in the present invention. These patents also disclose and discuss the background in the art to which the present invention is specifically directed. By incorporating these patents by reference, the problems to which the present invention is directed and the background of the field of art need not be repeated in detail.

BACKGROUND OF INVENTION

The present invention is particularly applicable for use in a container of welding wire stored as a large wire stack or coils or wire containing convolutions formed into layers of the welding wire which is paid out from the wire stack or coils through the upper portion of the container storing the wire stack or coils. However, the invention has broader applications and may be used with any type of welding wire contained in a wire stack or coils to be fed from the wire stack or coils through the top of the container with or without a tendency to retain a generally straight condition.

Welding wire is often shipped in a cylindrical drum which includes a cylindrical inner core. When it is desired to use the wire, a cone assembly is mounted at the top of the container. The cone assembly includes a payout arm extending upwardly from the top of the cone that is provided with an eyelet at its end and a central conduit for guiding the wire to a wire feeder mechanism.

When welding automatically or semi-automatically, it is essential that large amounts of welding wire be continuously directed to the welding operation in a non-twisted, non-distorted non-canted condition so that the welding operation is performed uniformly over long periods of time without manual intervention and/or inspection. It is a tremendously difficult task to be assured that the wire is fed to the welding operation in a non-twisted condition so that the natural tendency of the wire to seek a preordained natural condition will not be detrimental to smooth and uniform welding.

To accomplish this task, welding wire is produced to have a no-twist condition. Welding wire has a cast that is intentionally built into the wire when its is manufactured. The nature shape of the wire is not straight, but typically sinusoidal. A straight welding wire has difficulty in making reliable contact with the contact tip of a welding gun so as to properly pass current through the wire. The unsatisfactory wire contact can result is "arc flare" when contact is momentarily broken. The cast of typical welding wire is typically about 35–60 inches. If the cast is too small, the wire is highly sensitive to a helix thereby causing wire wobble when exiting a welding gun tip. When the cast is too large, the welding wire has difficulty in making reliable contact with the welding gun tip, and is also susceptible to conduit bending or becoming recast by small conduit radii as the wire is fed. This conduit bending or recasting of the welding wire can also result in wire wobble.

The wire can be manufactures either "no twist" or "with twist" when loosely wound in a wire package (e.g., drum, box, etc.). The traditional "with twist" wire drum is produced with a "dead block" technology and is intended to be used with a Lazy Susan turntable or dereeler which rotates the drum one turn per loop of wire as the wire is pulled. When the wire is pulled out of the drum, the twist induced in the wire by transforming a loop of wire from a circle into a straight line. The twist in the wire is cancelled by the Lazy Susan rotation of the package. The no-twist, or twist free package is intended to be used stationary. When the wire is laid in the package, the wire has a built-in twist of one rotation per loop. As such, as the wire is paid out of the package, the built-in twist cancels the twist induced by transforming a loop of wire into a straight line without having to rotate the package. Thus, manufacturers produce large containers of welding wire which must be paid out from the container without twisting, tangling and/or introducing unwanted canting into the wire itself.

In automatic and/or semi-automatic welding operations, a tremendous number of robotic welding stations are operable to consume welding wire from a package at each station as a continuous supply of wire to perform successive welding operations. The advent of this mass use of electric welding wire has caused tremendous research and development in improving the packaging for the bulk welding wire. A common package is a drum where looped welding wire is deposited in the drum as a wire stack, or body, of wire having a top surface with an outer cylindrical surface against the drum and an inner cylindrical surface defining a central bore. The central bore is often occupied by a cardboard cylindrical core as shown in Cooper U.S. Pat. No. 5,819,934, which is incorporated herein by reference. It is common practice for the drum to have an upper retainer ring that is used in transportation to stabilize the body of welding wire as it settles. This ring remains on the top of the welding wire to push downward by its weight so the wire can be pulled from the body of wire between the core and the ring. Each loop of wire has one turn of built-in twist so that when it is paid out, the twist introduced by releasing a loop of wire is canceled. Hence the wire is "twist-free" when it reaches the contact tip. The built-in twist causes the wire to spring up from the top of the stack when unrestrained. The weighted ring inhibits or prevents the wire from springing up which can result in the wire becoming tangled. Tangles are detrimental to the operation of the package since they cause down time of the robotic welding station. The most common tangle is a wire knot that forms between the ring and the hat. Such a knot is referred to as an e-script because of its shape. E-scripts in the wire can be attributed to several factors such as poor drive roll alignment in the feeder, inconsistent loop diameter, inconsistent fan-out of the loops, settling of the wire during transportation, and abuse in handling the drum of wire. An e-script tangle stops operation of the welder and must be removed. As a result, the tangling of the wire during the paying out of the welding wire results in the welding process having to be stopped, thus resulting in downtime. Such downtime reduces productivity efficiencies and increases production costs. This problem must be solved by manufacturers of welding wire as they sell the welding wire in quantities to be paid out for automatic and semi-automatic welding. This problem is compounded with the trend toward even larger packages with larger stock of welding wire to thereby reduce the time required for replacement of the supply container at the automatic or semiautomatic welding operation. Consequently, there is an increased demand for a container which is easily adapted to a large capacity and is constructed in a manner such that withdrawing of the welding wire from the container is accomplished smoothly without disturbing the natural flow of the welding wire or twisting the welding wire with adjacent convolutions.

Tangling of the wire can cause interruption of wire flow and drastically interrupt the welding operation. Thus, a large volume, high capacity storage or supply container for welding wire formed in wire stacks or coils must be so constructed that it assures against any catastrophic failure in the feeding of a wire to the welding operation and the container. Further the payout or withdrawing arrangement of the container must be assured that it does not introduce even minor distortions in the free flow of the welding wire to the welding operation. Consequently, there is a substantial demand for a container and withdrawing arrangement for large quantities of welding wire which not only prevents tangling and disruption of the supply of welding wire to the welding operation, but also prevents e-script tangles and other types of tangles under adverse conditions such as abuse in the handling and poor wire feeder drive roll alignment, together with excellent wire placement consistency and reliable wire-to-tip contact without arc flare. This can be accomplished by a more robust design of the package and payout mechanism.

The welding wire stored in the supply container is commonly in the form of a wire stack or coils having multiple layers of wire convolutions laid from bottom to top, with an inner diameter of the wire stack or coils being substantially smaller than the diameter of the container. Due to the inherent rigidity of the welding wire itself, the convolutions forming the layers are continuously under the influence of a force which tends to widen the diameter of the convolutions. However, as the welding wire is withdrawn from the container, the loosened wire portion tends to spring up and disturb or become entangled with other looped layers or with itself causing premature pop out of the wire loop to the inside bore, causing the top loop of the wire to more under lower wire loops, causing the wire loop to stretch and extend beyond the outside diameter of the wire stack and thereby fall down the outer periphery of the wire stack, and causing an expanded loop diameter of the wire resulting in the wire popping up above the outer periphery of the retaining ring thereby catching the ring. In such cases, it becomes difficult to withdraw the wire or feed the wire smoothly. In some of the prior containers, the wire is provided with a preselected twist when inserting the wire into the package in order to prevent torsional deformation of the wire which is being withdrawn axially from the non-rotating container. Consequently, the packaged wire of the wire stack or coils tends to spring up with a greater force. As a result, retainer rings or members are placed on the top of the wire stack or coils to hold the wire in the upper layers in place as it is withdrawn, convolution at a time, from the center opening of the wire stack or coils through the top opening of the supply container. Another defect in past wire packaging designs is the inability of the package to deal with excess and unsupported wire between the top of the hat and the retaining ring. After the wire leaves the top of the stack and escaping the constraint imposed by the retaining ring, the wire is essentially loose, unsupported and unstable until the wire reaches the top of the hat and enters the liner above the hat where the wire is again supported. The essentially loose, unsupported and unstable that is between the retaining ring and the top of the hat attempts to release any trapped energy in the wire. This is especially the case where there is excess wire coming from premature pop-out of wire loops from the retaining ring. The form the wire takes in attempting to release this excess energy is typically undesirable such as resulting is a knot. The loose, unsupported section of the wire can commonly result in the formation of e-script tangles in the wire.

In the past, substantial effort has been devoted to the prevention of the wire springing up which can result in a feeding error from the container. This feeding error is normally prevented by a center tube of cardboard placed in the wire stack or coils cavity so that all convolutions must be withdrawn from around the center tube. In the prior art, the ring itself contacts the inner surface of the container to prevent convolutions from springing above and around the outside of the retainer ring. In the past, the retainer ring generally rests upon the top of the wire stack or coils by gravity. The suspended float ring assembly is placed on top of the wire in the container to assist in keeping the wire from becoming tangled as it is fed out of the container. The suspended float ring assembly commonly includes an annular metal ring that surrounds the inner core and a plurality of flexible fingers or feathers that extend radially outwardly and slightly upwardly of the ring and into contact with the inner surface of the drum. These fingers can be constructed of plastic. The float ring is suspended, that is, it rests freely at the top of the coil of wire in the container. Some of the prior rings have had a series of flat spring steel fingers attached to the retainer ring. These fingers tightly ride against the drum to control the outside convolutions of wire. In some instances, a cardboard ring is cut to the desired shape with a slight interference with the drum wall. This ring is held on the top of the wire stack or coils by a weight which travels down the drum as the wire level is reduced.

All of these arrangements present difficulties when the wire is paid out from a package. Wire can be tangled on the outside of the ring and substantial drag can be imparted to the wire as it is being paid out or withdrawn from the container. As the wire is removed from the container, a part of the wire coil sprang upwardly and become caught between the float ring and the inner core, or wrap around the core, or forms a knot, thus causing a tangle. Also, the wire above the float ring would sometimes wrap around the inner core, particularly as the float ring assembly descended downwardly as the container emptied.

In an effort to provide better support of the wire, an improved retainer ring was developed as disclosed in U.S. Pat. No. 5,277,314. The retainer ring or retainer member included a generally flat outer portion with an outer periphery fitting into a set diameter of the inner wall of the container and had a number of projecting lobe portions whereby the outer periphery of the retainer ring contained alternate areas that were closer to and then farther away from the outer wall of the container when the retainer ring was resting on the upper surface or top of the hollow, cylindrical wire stack or coils of welding wire. The retaining ring also had an inner bell mouthed portion defining an innermost wire extraction opening wherein the convolutions of wire are pulled up through the bell mouthed portion which extended upwardly toward the outlet guide in the top cover or "hat" of the container. The convolutions of wire, as they were pulled from the wire stack or coils, move inwardly toward and into the center cavity of the wire stack or coils and then upwardly through the bell mouth portion toward the exit guide in the container hat. The wire extraction opening defined by the upper end of the bell mouthed portion of the retainer ring included a diameter substantially smaller than the selected diameter of the wire stack or coils itself so that the wire must moved inwardly before it can move upwardly. By using this bell mouthed concept, the upward movement of the convolutions from the wire stack or coils did not have better support against other convolutions and does not have better support drag along the bottom of the retainer ring as the convolutions from the upper layer were moved inwardly and then upwardly to the outlet guide in the cover or hat of the supply container.

Another prior art retaining ring is disclosed in U.S. Pat. No. 5,758,834. The wire control ring is mounted at the upper part of the inner core and provided with finger and an arrangement that prevents the wire from entering into the space between the ring and the core. The wire control ring has an annular metal ring having an inner diameter which is slightly greater than the outer diameter of the drum's inner core, and an outer diameter which permits the unobstructed removal of wire from the drum. A set of three or four fingers or feathers attached to the ring extend outwardly and slightly upwardly into contact with the inner surface of the drum. The width of these fingers is significantly greater than the width of the prior art feathers to insure that the wire is forced against the inner surface of the drum as it is pulled from the drum and removed. The stiffness of the feathers is such that the wire cannot by itself uncoil and exit the drum, but it not so stiff that the resistance to wire movement from the drum adversely affects the wire feeding process. A diverter member prevents wire from inadvertently entering the space between the ring and the drum's inner core.

Although these retaining rings have reduced the incidence of tangling of the welding wire paid out from a container of welding wire, small twists or e-scripts still occur during payout of the welding wire. These twists or e-scripts in the wire can result insubstantial downtime of the welding process in order to untangle the welding wire.

In view of the continuing problems associated with weld wire payout from wire containers and the periodic occurrence of twists or e-scripts in the welding wire during payout, the remains a continued need for a welding wire payout arrangement for wire containers which reduces the occurrence of wire tangles and twists or e-scripts in the welding wire during payout of the welding wire from a wire container.

SUMMARY OF THE INVENTION

The present invention relates to a container for wire arrangement and method for paying out the wire from the container while minimizing entanglement of the wire during the payout and further minimizing the formation of e-scripts in the wire during the paying out of the wire from the container. The invention is particularly directed to the paying out of welding wire from containers for use in automatic or semiautomatic welding; however, the invention has broader application and can be used for the paying out of many different types of wire which are in form of wire stacks or coils and packaged in a container. The invention is also particularly directed to small diameter wire and will be described with particular reference thereto; however, the present invention can be used to payout other types of wire.

In accordance with the present invention, there is provided a floating liner for container of no-twist welding wire which container includes a cylindrical outer wall having a substantially uniform diameter, a lower partition for supporting the welding wire and an upper opening wherein the container is adapted to hold and allow controlled payout or withdrawal of a multitude of convolutions of welding wire formed into the layers defining a hollow, substantially cylindrical wire stack or coils of welding wire. As can be appreciated, the container can have shapes other than a cylindrical shape; however, a cylindrically shaped container is the most common. The wire stack or coils of welding wire wound in the supply container has a substantially outer cylindrical surface generally engaging the interior wall of the container and an inner substantially cylindrical surface defining a central cavity of the wire stack or coils of welding wire. The central cavity of the wire stack or coils of welding wire has a substantially uniform diameter throughout the longitudinal length of the wire stack or coils. A container lid, not shown, is commonly placed on the top of the container during shipping, or when the welding wire is being stored. The lid is removed from the container and a payout mechanism is installed in its place when the welding wire is to be used. During shipment and storage, a steel rod held down by a rubber band is typically used to hold the wire downward in the container to prevent or inhibit the wire from unwinding or unraveling during shipment; however, other arrangements can be used (e.g., foam blocks). The steel rod, when used, is removed prior to the payout mechanism being attached to the top of the container. The payout mechanism that is placed on the top of the container typically includes a conically shaped housing or bell mouth shaped housing similar to those disclosed in U.S. Pat. Nos. 5,277,314 and 5,758,834, both of which hereinafter are incorporated by reference. The bottom of the payout mechanism is typically the same or similar size as the top of the container so that is fits and is held in position on top the container. Typically, the payout mechanism is clipped, bolted, or otherwise releasably secured to the top of the container. Once the welding wire in the container is fully paid out from the container, the payout mechanism is removed from the container and placed upon a new container full of welding wire. The convolutions of wire, as they are pulled from the wire stack or coils of wire, move inwardly toward and into the center cavity of the wire stack or coils and then upwardly through the payout mechanism and toward an exit location in the top of the payout mechanism to thereby be ultimately fed to a welding gun or other welding device. The opening through the top of the payout mechanism has a cross-sectional area which is substantially smaller than the cross-sectional area of the wire stack or coils itself so that the welding wire, when being paid out from the container, moves inwardly toward the center of the container and then upwardly through an opening in the top portion of the payout mechanism. By using this configuration of the payout mechanism, the inward movement of the convolutions from the wire stack or coils of welding wire have better support/stiffness as the convolutions from the upper layer of the welding wire are moved inwardly and then upwardly to an outlet in the payout mechanism of the supply container. There are various causes of tangling of the welding wire as it is being withdrawn from a wire stack or coils of welding wire within the supply container. For instance, wire tangles can be caused by poor drive roll alignment in the feeder which can introduce a twist in the wire. The twist in the wire can cause the wire to move back into the drum and subsequently cause premature popping out of wire loop as it is being paid out from the container. This extra wire is initially stopped by the core, but will eventually move its way upward until it clears the top of the core, resulting the loops folding on to one another and forming a knot. Tangling of the wire can also result from inconsistent loop diameter of the wire in the container and inconsistent fan-out of the loops of wire in the container. In both of these situations, the wire can prematurely pop up and subsequently form tangles as the wire is being paid out from the container. Tangles can further be caused by the settling of the wire during transportation, and abuse in handling the drum of wire. Wire tangles can also be caused when a small amount of wire is left on the wire stack or coils in the drum or container and there is a long unsupported coil of the wire from the wire stack or coils toward the upper cover of the container. In this instance, the wire can get ahead of itself and allow an extra turn to be released, thus becoming tangled. These and other causes of tangling the wire are addressed by the present invention. These tangling phenomenon have been partially addressed in the past by adding a tubular core typically made of cardboard to the inside of the wire stack or coils to inhibit or prevent the convolutions from becoming free or loose, and thus flipping from one side of the container to the other, or by using a core of this type together with a mechanized dereeling "hat" that has a rotating guide inside the container that follows the welding wire in a rotating fashion around the container. One common type of dereeling hat is disclosed in U.S. Pat. No. 5,758,834. This rotating mechanism effectively shortens the unsupported column of wire. Both of these structures are costly, and the rotating mechanism is rigid thus not adaptive as the stack is paid down when the wire is consumed. The space between the guide and the top of the stack increases as the stack lowers, thus cannot prevent premature pop-outs of the welding wire. The present invention addresses these tangling phenomenon without requiring costly mechanisms used in the payout mechanism, and interfering with the smoothness of the welding process, as has occurred in past mechanisms. The use of a smaller diameter opening in the exit of the payout mechanism, which defines the point of extraction of the welding wire from the payout mechanism, reduces or eliminates the need for the inner core in a container or drum of welding wire. The shape of the payout mechanism results in only a small amount of contact between the under surface of a retaining ring and the welding wire as the welding wire is being drawn from the top layer of the welding wire stack or coils. The smaller diameter of the opening in the top of the payout mechanism also makes it difficult for a free convolution of wire to find its way to tangle from the outside by snapping over the top of a retaining ring. As a result, the configuration of the payout mechanism allows for smooth and substantially uniform withdraw of the welding wire from the wire stack or coils in the storage or supply container and substantially reduces the amount of tangling that occurs during the payout of the welding wire from the container. The configuration of the payout mechanism also results in less drag on the wire as it is withdrawn underneath the retaining plate, thus resulting in enhanced smoothness of the welding process from use of the welding wire in the container.

In yet another and/or alternative aspect of the present invention, the payout mechanism includes a floating liner that is positioned above the top layers of wire stack or coils and typically above the retaining ring. The floating liner is designed to receive welding wire which is unwound from the top layers of the wire stack or coils of welding wire and to guide the welding wire to the top opening in the payout mechanism. The use of the floating liner is designed to inhibit or prevent the formation of e-scripts or twists in the welding wire as it travels upwardly to the top opening in the payout mechanism. Any e-script or twist in the welding wire can result in downtime on a work piece during a welding process. Any e-script or twist can cause the welding wire to become jammed in a welding gun or wire feeder and/or cause an interruption in the uniform feeding of the welding wire through a wire feeder and/or welding gun. As a result, these e-scripts or twists in the welding wire can cause the welding wire to jam in a wire feeder or welding gun, the welding process must temporarily terminated to dislodge the jammed welding wire, thus resulting in interruption of the welding process, which can be especially costly and time consuming for automated welding processes. One or the primary defects of prior wire containers was the inability to deal with excess and unsupported wire between the top of the hat and the retaining ring. After the wire left the top of the stack and escaped the constraint imposed by the retaining ring, the wire is essentially loose, unsupported and unstable until the wire reaches the top of the hat and enters the liner above the hat wherein the wire is once again supported. During the payout of the wire, the welding wire becomes unbalanced and typically has a residual twist. The welding wire attempts to release this trapped energy by prematurely popping out from under the retaining ring. The premature popping out of the wire in turn can result in the formation of knots in the wire. As such, this loose, unsupported wire is a breeding ground for e-script tangles to form. The use of the floating liner provides mechanical support and rigidity to the wire in the region between the retaining ring and the top of the hat to inhibit or prevent the occurrence of formation of twists or e-scripts in the welding wire as it is paid out from the container. Better support of the wire in this region results in higher stiffness of the wire and less likelihood of the wire buckling or forming a knot (i.e. fold upon itself). The floating liner also provides rigidity to the wire which results in the reduce incidence of pop-out of the wire loops. In one embodiment of the invention, the flexible floating liner includes a tube or tube-like structure that includes an interior passageway which is larger than the diameter of the welding wire; however, not so large as to allow the welding wire to become twisted within the floating liner. Non-limiting examples of such structures include spring shaped structures, hose-shaped materials, and the like. Typically, the passageway in the floating liner is generally cylindrically shaped and has a diameter which is less than about 6 times the diameter of the welding wire, typically less than about 4 times the diameter of the welding wire, and more typically less than about 3 times of the diameter of the welding wire. As can be appreciated, other shapes of the passageway through the floating liner can be used. In another and/or alternative embodiment of the present invention, the floating liner is substantially tubular shaped however other shapes can be used. In still another and/or alternative embodiment of the present invention, the interior passageway of the floating liner has a surface which is relatively low in friction so as to facilitate in the movement of the welding wire through the passageway of the floating liner. A surface of the passageway which creates high friction contact between the welding wire and the surface of the passageway could result in nonuniform and/or impeded movement of the welding wire through the floating liner thereby potentially impairing the feed speed and/or force fluctuation causing wire excursion and gun chatter. The low friction surface of the passageway can result from the material which forms the floating liner itself, and/or be the result of a low friction coating and/or low friction sleeve which is inserted into the passageway. Examples of low friction materials in a coating and/or sleeve include, but are not limited to, Teflon, $MoS_2$, graphite and/or the like. In still another and/or alternative embodiment of the present invention, the floating liner is made of a durable material which resists wear as a welding wire is fed through the passageway of the floating liner. Such materials include but are not limited to metals, plastics, nylons, polyethylenes, thermoplastic resins, and the like can be used. In one aspect of this embodiment, the floating liner includes or is made up of a material such as nylon, polyethylene, polypropylene and/or mixtures thereof. In another aspect of this embodiment, the floating liner includes or is made up of a material which includes a mixture of $MoS_2$ and nylontron. In still another and/or alternative aspect of this embodiment, the floating liner includes or is made up of a material that includes Teflon.

In still a further and/or alternative aspect of the present invention, the floating liner includes a sleeve at the lower end of the floating liner which is designed to receive the welding wire and to guide the welding wire into the passageway of the floating liner. The sleeve can be made up of a variety of materials such as plastics, metals, polymer resins and the like. The sleeve includes an opening which has a cross-sectional area which is typically smaller than the cross-sectional area of the passageway within the floating liner. The sleeve can include a beveled edge which is designed to facilitate in the guiding of the welding wire into the opening in the sleeve and ultimately into the passageway of the floating liner. In one embodiment of the invention, the opening in the sleeve is made of a material and/or is coated with a material which creates a low friction contact between the welding wire and the opening in the sleeve so as to not impede or impair the movement of the welding wire into and through the sleeve. In another and/or alternative embodiment of the invention, the sleeve can be permanently or removably connected to the end of the floating liner. This connection can take many forms such as threads, ribs, adhesives, clamps, belted connections and or the like. In yet another and/or alternative embodiment of the invention, the sleeve includes a sleeve flange which is designed to be insertable into a sleeve cavity at the end of the floating liner. The sleeve flange is used to facilitate in the connection of the sleeve to the end of the floating liner.

In yet a further and/or alternative aspect of the present invention, the floating liner is not connected at either end thereby enabling the floating liner to move freely between the top of the container and the retaining ring. Typically the length of the floating liner is more than the straight line distance between the retaining ring when the container is full of wire and the top of the container; however, this is not required. As the welding wire is paid out from a container, the welding wire travels through the passageway of the floating liner. Since the welding wire is wound in a wire stack or coils, the end of the floating liner follows the convolutions of the welding wire as the welding wire rises above the retaining ring. The floating liner floats at position between the top of the container and the retaining ring. The floating liner does not stay in one position, but instead moves up and down between the top of the container and the retaining ring. The use of the floating liner facilitates in inhibiting or preventing the wire as it rises about of the retaining ring from becoming tangled which can result in the formation of e-scripts.

In still a further and/or alternative aspect of the present invention, the floating liner is rotatably connected to the top of the payout mechanism to enable the floating liner to rotate about the interior of the container as the welding wire is paid out from the container. In this embodiment, only the bottom of the floating liner floats. Typically the length of the floating liner is more than the straight line distance between the retaining ring when the container is full of wire and the top of the container; however, the length of the floating liner can have a shorter length than the straight line distance between the retaining ring when the container is full of wire and the top of the container. In this arrangement, the end of the floating liner floats above the retaining ring while the top end of the floating liner is fixed to the top of the container. The rotatable connection of the upper end of the floating liner can be formed by a variety of arrangements. The rotatable connection between the end of the floating liner and the payout mechanism is typically designed to allow for substantially free rotation of the floating liner relative to the upper region of the payout mechanism. As the welding wire is paid out from a container, the welding wire travels through the passageway of the floating liner. Since the welding wire is wound in a wire stack or coils, the end of the floating liner follows the convolutions of the welding wire on the top layer of the wire stack or coils. As the bottom end of the floating liner follows these wire convolutions, the bottom end of the floating liner moves in a circular pattern in the interior of the container. The rotational connection of the upper end of the floating liner allows for the lower end of the floating liner to freely rotate within the container and follow the convolutions of the welding wire within the container. The use of the floating liner facilitates in inhibiting or preventing the wire as it rises about of the retaining ring from becoming tangled which can result in the formation of e-scripts. In one embodiment of the invention, the upper end of the floating liner includes a cap having an opening there through to allow the wire traveling through the passageway of the floating liner to exit from the floating liner through the opening in the cap. The cap is rotatably engaged with an upper portion of the payout mechanism. Typically the upper portion of the payout mechanism includes a hat guide that includes a cavity which engages the cap secured to the end of the floating liner to allow the cap to be retained in the hat guide and to further allow the cap to rotatably move within the hat guide as the floating liner rotates within the container. As can be appreciated, many other arrangements can be used to rotatably secure the end of the floating liner to the upper region of the payout mechanism.

In still yet a further and/or alternative aspect of the present invention, the floating liner includes a weight distribution or profile that results in the lower end of the floating liner to at least partially float on the top surface layer of the welding wire in the container or retaining ring. As the welding wire passes into and through the passageway of the floating liner, an upward force is applied to the floating liner due to the frictional contact of the welding wire with the surfaces of the passageway of the floating liner and other up-lifting forces. These upward forces tend to draw and move the floating liner upwardly toward the top region of the payout mechanism. The weight distribution of the floating liner selected so as to counter this upward force being applied to the floating liner by the welding wire moving through the floating liner. The weight distribution of the floating liner is selected such that the weight of the floating liner creates a downward force which is equal to or closely equal to the upward force being applied to the floating liner as the welding wire passes through the floating liner. The equal or closely equal upward and downward forces results in the lower end of the floating liner to substantially float in the container. For instance, when the container is filled with welding wire, The bottom end of the floating liner typically rests on or closely adjacent to the top surface of the welding wire in the container or on the top surface of the retaining ring when the wire is not being paid out from the container. When the wire is paid out from the container, the frictional forces on the floating liner that are applied by the wire as it pass through the floating liner drive the floating liner upwardly toward the top of the container. The weight distribution or weight profile of the floating liner is selected so as to counter the frictional forces applied to the floating liner such that the bottom end of the floating liner appear to float in the container as the wire is paid out of the container. As such, in a container full of wire, the bottom end of the floating liner will appear to float above or closely above the top surface of a layer of welding wire or retaining ring in the container as the wire is paid out of the container. This floating effect results in the lower end of the floating liner periodically lightly contacting but not impairing the top surface of the welding wire or retaining ring, thereby allowing the lower end of the floating liner to substantially freely move and rotate in the interior of the container as the welding wire is paid out from the container. The length of the floating liner can be selected to allow the bottom end to follow the top surface of the wire or retaining ring downwardly as the wire is paid out from the container. Alternatively, the length of the floating liner can be selected such that the bottom end of the floating liner is closest to the top surface of the wire or retaining ring when the container is full of welding wire. In this arrangement, the bottom end of the floating liner appears to float in a generally contain region in the container as the wire is paid out from the container. When the floating liner has a length that allows the bottom end to partially or fully follow the top surface of the wire or retaining ring, the weight distribution of the floating liner causes the lower of bottom end of the floating liner to be positioned at least closely adjacent to the top layer of the welding wire retaining ring so as to minimize the space between the point where the welding wire is unwound from the wire stack or coils and the point where the welding wire enters the passageway of the floating liner. By minimizing this space, incidents of twisting or e-scripts are significantly reduced. The weight distribution of the floating liner is also selected so as to cause the lower or bottom end of the floating liner to move downwardly in the container as the welding wire is paid out from the container during the course of a welding operation. This downward movement of the lower end of the floating liner maintains the minimal distance between the point where the wire is unwound from the wire stack or coils of wire and the point where the wire enters the interior passageway of the floating liner. In one embodiment of the present invention, the weight distribution of the floating liner can be fixed on the floating liner, be adjustable on the floating liner, be uniform throughout the length of the floating liner, and/or be more weighted in certain regions on the floating liner. In one aspect of this embodiment, a greater weight is located at the lower end of the floating liner than in many, if not all, of the other regions of the floating liner. The positioning of a greater weight at or near the lower end of the floating liner facilitates in the maintaining of the lower end of the floating liner closely adjacent to a top surface of a layer of welding wire or retaining ring in the container as the welding wire is paid out from the container. In another and/or alternative aspect of the present invention, a fixed or removable weight is secured at or near the lower end of the floating liner. This weight can be in the form of a sleeve which is connected to the end of the floating liner, a separate weight which is permanently or removably connected to or near the end of the floating liner, or combinations thereof. When the weight is removably connected to the floating liner, the weight can be removably connected in a variety of arrangements such as hook and loop fasteners, clamps, tongue and groove arrangements, friction connections and/or the like. When the weight is permanently secured to the floating liner, the weight can be secured in a variety of way such as but not limited to adhesives, melted connections, rivets, clamps and/or the like. In still another and/or alternative aspect of the present invention, the floating liner can be formed with the material make up of the floating liner and/or the dimensions of the floating liner create the desired weight distribution of a floating liner. For example, the floating liner can be made up of a variety of different materials which create the desired weight distribution in the floating liner. In another nonlimiting example, the floating liner can have different dimensions such as thicknesses, cross-sectional shapes and/or the like which result in a uniform or variant weight distribution throughout the length of the floating liner.

In another and/or alternative aspect of the present invention, the floating liner is made of a flexible material which enables the floating liner to partially bend and conform to the shape of the wire as it travels through the passageway of the floating liner, enables the lower end of the floating liner to move downwardly in the container as the welding wire is paid out from the container, and/or enables the lower end of the floating liner to at least partially float at least closely adjacent to a top surface of the layer of welding wire or retaining ring in the container as the welding wire is paid out from the container. The flexible liner can be fully or partially made up of a flexible material. Typically, at least the lower region of the flexible liner is made up of a flexible material. When the lower region includes a flexible material, the lower region at least partially forms into a helical shape which follows the form of the shape of the wire which is being unwound from the wire stack or coils of wire in the container. The flexibility of the lower region of the floating liner facilitates in the movement of the welding wire into and through the floating liner, thereby further reducing the incidents of twisting or e-scripts in the welding wire as it is paid out from the container. The flexible material of the floating liner allows for a certain degree of lateral movement of the flexible liner which enables the flexible liner to at least partially conform into a helical shape; however, the flexible material prevents or substantially resists contraction of the flexible material along the longitudinal length of the floating liner. As such, the longitudinal length of the floating liner remains substantially the same as the welding wire travels through the floating liner as it is being paid out from the container.

In accordance with still another and/or alternative aspect of the present invention, the floating liner includes a substantially rigid material. The floating liner can be fully or partially made of a rigid material. When the lower portion of the floating liner includes a rigid material, the shape of the lower portion is formed in a generally helical shape so as to facilitate in the movement of wire into and through the flexible liner.

In still yet another and/or alternative aspect of the present invention, the upper end of the floating liner includes a plurality of telescoping portions which facilitate in the movement of the lower region of the flexible liner at least partially downwardly in the container as the welding wire is paid out from the container for the purpose of supporting the wire from the point the drum is full to the point that the drum is or nearly empty. Typically, these telescoping portions are substantially rigid sections so as to not impair the movement of the lower region of the floating liner downwardly. The telescoping portions of the floating liner also allow for the floating affect of the lower end of the floating liner which floats at least closely adjacent to the top surface of a layer of welding wire or retaining ring in the container as the welding wire is paid out from the container. The telescoping sections typically include lips which prevent the telescoping sections from separating from one another yet still allow for the telescoping sections to easily move with respect to one another. In one embodiment of the invention, the telescoping sections are oriented substantially parallel to one another.

Typically, when the payout mechanism is positioned in the container, the telescoping sections are oriented substantially parallel to the longitudinal axis of the container; however, other orientations can be used. This orientation of the telescoping sections facilitates in the floating of the lower portion of the floating liner at least closely adjacent to a top surface of the layer of welding wire or retaining ring in the container as the welding wire is paid out from the container. The telescoping sections can be designed to enable the lower of bottom end of the floating liner to only partially follow the top surface of the layer of welding wire or retaining ring in the container as the welding wire is paid out from the container, or to enable the lower of bottom end of the floating liner to substantially completely follow the top surface of the layer of welding wire or retaining ring in the container as the welding wire is paid out from the container. As can be appreciated, other orientations of the telescoping sections with respect to the longitudinal axis of the container can be used.

The primary object of the present invention is the provision of an improved wire control device for controlling the dispensing of wire from wire storage drums.

Another and/or alternative object of this invention is to provide a wire control device which reduces the tangling of wire as the wire is being uncoiled from a storage drum.

Still another and/or alternative object of this invention is to provide a wire control device which reduces the twisting or formation of e-scripts and/or other types of tangles in the wire as the wire is being uncoiled from a storage drum.

Yet another and/or alternative object of this invention is to provide a wire control device for an automatic, or semi-automatic welding wire container which wire control device allows for removal of the welding wire from a container of supply of welding wire smoothly, without tangling of the wire.

Still yet another and/or alternative object of this invention is to provide a wire control device which inhibits catastrophic tangling of the wire being withdrawn from a supply container as it is being withdrawn from the storage container.

A further and/or alternative object of this invention is to provide a wire control device that includes a tube having two ends and a passageway extending between the two ends, and neither end of the tube is connected so as to enable the tube to move upwardly and downwardly in the container as the wire is paid out from the container, and a weight profile for the tube that causes the tube to at least partially float on a top surface of a layer of wire in the container as the wire is at least partially paid out of the container.

Yet a further and/or alternative object of this invention is to provide a wire control device that includes a tube having two ends and a passageway extending between the two ends, one of the ends adapted to be rotatably connected to a top portion of a container of wire to enable the tube to rotate in the container as the wire is paid out from the container, and a weight profile for the tube that causes one of the tube ends to at least partially float on a top surface of a layer of wire in the container as the wire is at least partially paid out of the container.

Still a further and/or alternative object of this invention is to provide a wire control device that includes a weight distribution on a tube that creates a downward force on the tube that is approximately equal to an upward force applied to the tube as the wire being paid out of the container passes through the tube.

Yet a further and/or alternative object of this invention is to provide a wire control device that includes a weight distribution on a tube that is greatest weight at least closely adjacent to one end of the tube.

Still yet a further and/or alternative object of this invention is to provide a wire control device that includes a weight distribution on a tube that is adjustable.

Another and/or alternative object of this invention is to provide a wire control device that includes a weight distribution on a tube that includes a removably connected weight.

Still another and/or alternative object of this invention is to provide a wire control device that includes a flexible tube.

Yet another and/or alternative object of this invention is to provide a wire control device that includes a tube having includes a sleeve secured to one end of the tube which sleeve at least partially guides the wire into the passageway of the tube.

Still yet another and/or alternative object of this invention is to provide a wire control device that includes a tube having a sleeve which includes a beveled opening.

A further and/or alternative object of this invention is to provide a wire control device that includes a tube having a sleeve which includes a low friction surface.

Still a further and/or alternative object of this invention is to provide a wire control device that includes a tube having a passageway that includes a low friction surface.

Yet a further and/or alternative object of this invention is to provide a wire control device that includes a tube having a lower portion in the shape of a helix.

Still yet a further and/or alternative object of this invention is to provide a wire control device that includes a tube having an end that can at least partially be telescopically received in a top portion of the container as the wire in the container is paid out from the container.

Another and/or alternative object of this invention is to provide a wire control device that includes a substantially rigid portion.

Still another and/or alternative object of this invention is to provide a wire control device that includes a top portion of a tube that is oriented substantially parallel to a longitudinal axis of the container.

Yet another and/or alternative object of this invention is to provide a wire control device that includes a tube having an end that includes a plurality of substantially rigid sections that are connected to one another and wherein at least one section at least partially telescopically receives another section.

Still yet another and/or alternative object of this invention is to provide a wire control device that retracts into the liner above the hat that has a bottom lip that prevents the tube from fully retracting into the liner.

These and other objects and advantages will become apparent from the following description used to illustrate the preferred embodiment of the invention when read in conjunction with the accompanying drawings.

BRIEF DESCRIPTION OF DRAWINGS

FIG. 6 is a partial sectional view of the floating liner illustrating the force relationships on the floating liner as the welding wire passes through the floating liner;

FIG. 7 is a cross-sectional view taken along line 7—7 of FIG. 6; and, FIG. 8 is a cross-sectional view of a container showing another embodiment of the floating liner of the present invention.

PREFERRED EMBODIMENT OF THE INVENTION

Figure 1:
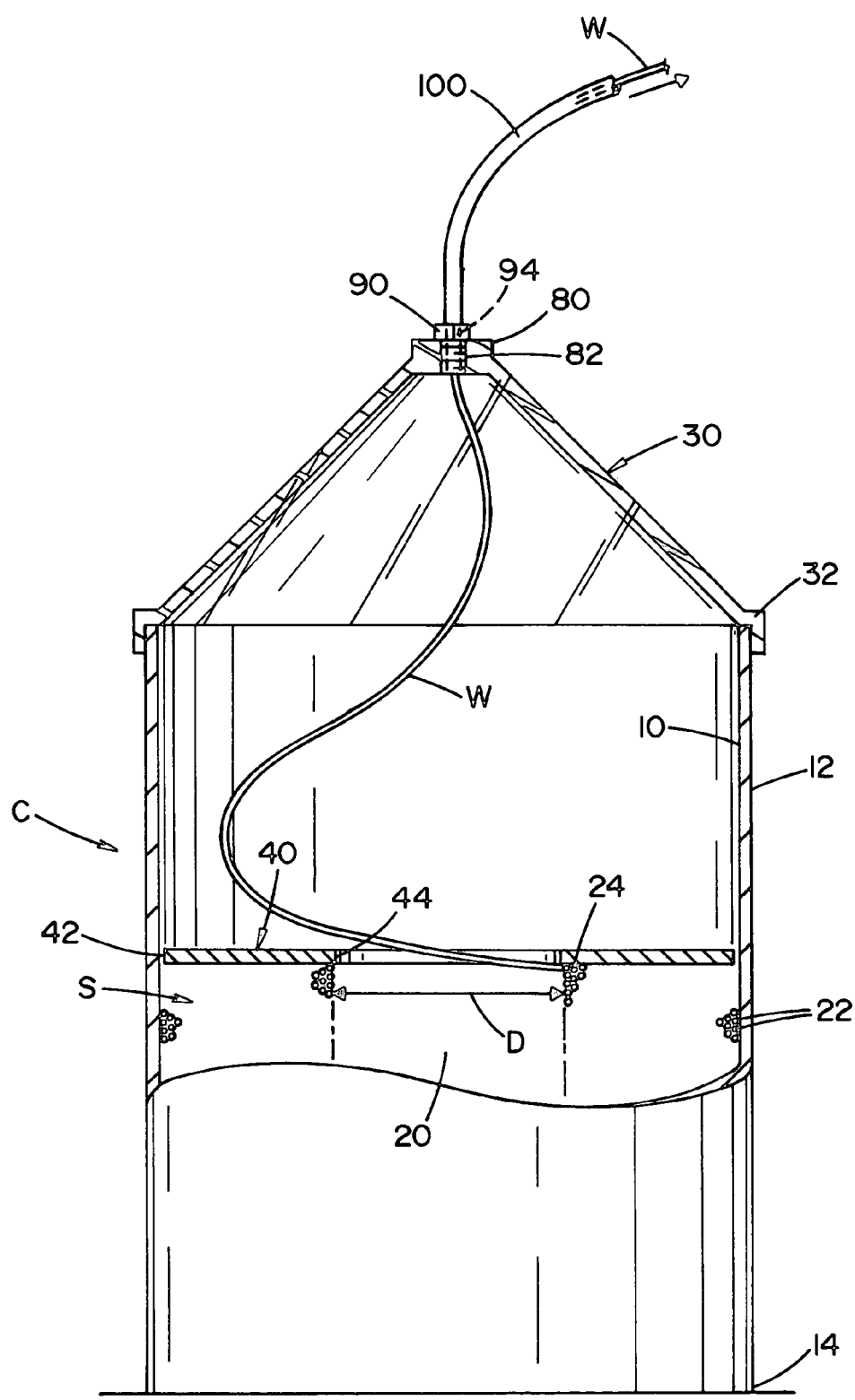
FIG. 1 is a front sectional view of a prior art container of welding wire.

Referring now to the preferred embodiment of the drawings, wherein the showings are for the purpose of illustrating a preferred embodiment of the invention only and not for the purpose of limiting the invention, FIG. 1 illustrates a prior art container C used in dispensing a no-twist welding wire for automatic and/or semiautomatic welding. The container includes a standard drum, hereinafter referred to as the container, which container may be formed of cardboard or other materials and has an interior wall 10, and outer wall 12, and a base 14. Within the container is stored a large volume of welding wire in the form of a wire stack or coils S having an internal cavity 20 with an internal diameter D. The wire stack or coils wire is formed from several convolutions or layers 22 of no-twist wire. The upper portion of the wire stack or coils includes generally flat top surface layers 22 of welding wire. As the welding wire is withdrawn from wire stack or coils S, it first comes from the upper layer forming the generally flat top layer 24 and then from the next layer and advances from the top to the lower portion of the wire stack or coils.

Positioned above wire stack or coils S is a payout mechanism or "hat" 30 through which welding wire W is withdrawn from container C. The hat includes a generally inverted conical shape; however, other shapes can be used (e,g, bell shaped, etc.). Hat 30 includes a landing 32 in the form of a flange which is designed to rest on the top edge of container C. The hat is typically formed from a durable of material such as, but not limited to, metal, plastic, fiber glass, durable polymeric material and the like. Hat 30 is typically releasably connected to container C and one or more connectors are typically used to releasably secure the landing of the hat to the top of the container C. The mechanisms used to secure the hat to the container can include, but are not limited to, threads, clamps, latches, bolts, hook and groove fasteners, and/or the like. The hat is designed to have cross-sectional area that reduces from the point where the payout mechanism contacts the top region of the container to the point where the welding wire exits the top of the payout mechanism. This reduction in cross-sectional area can be uniform or nonuniform.

A gravity retainer ring 40 formed of a flat sheet of material such as steel is positioned on the top flat layers 24 of wire stack or coils S. Retainer ring 40 includes an outer edge 42 having a diameter which is slightly less than the inner diameter of container C. Retainer ring 40 also includes a central opening 44 which has a diameter which is slightly less than the internal diameter D of wire stack or coils S. The retainer ring is designed to inhibit or prevent convolutions of wire from the upper surface 24 of wire stack or coils S from popping up as the welding wire W is paid out from container C. As illustrated in FIG. 1, welding wire W is fed through the central opening 44 of retainer ring 40 as its being paid out from the container. Typically the central opening is circular; however, other shapes can be used. The opening in the retaining ring is typically centrally located within the retaining ring and has a cross-sectional area which is the same as or less than the size of the cross-sectional area of the central core of the wire stack or coils of welding wire in the container. The feeding of the welding wire through the central opening causes the welding wire to move toward the center of the wire stack or coils as its being paid out, thus reducing the incidents of tangling of the wire which commonly occur at the outer edge of the wire stack or coils. The diameter of the outer edge 42 of the retainer ring is smaller than the diameter of the interior wall of container C so that retainer ring 40 can freely move downwardly in container C as the welding wire is depleted from wire stack or coils S. The retaining ring is made of material that has a weight which is sufficient to inhibit or prevent the welding wire from prematurely uncoiling in the wire stack or coils and to further have a sufficient weight to cause the retaining ring to move downwardly in the container of welding wire. The retaining ring is typically made of a metal material that is sufficiently thick so as to not be distorted as the welding wire is drawn through the central opening in the retaining ring and further has a sufficient weight due to the type of material and thickness of the material so as to move downwardly in the container as the welding wire is paid out from the container.

Positioned in the top of hat 30 is a hat top 80. Hat top 80 includes a top opening 82 wherein a guide bolt 90 is threaded therein until the head of the guide bolt engages the top surface of hat top 80. Guide bolt 90 includes a central opening 94 to allow welding wire exiting the end of the welding wire passing through the hat guide and pass through guide bolt 90 and into guide tube 100. The opposite end of guide tube 100 is typically connected to a wire feeder or welding gun, not shown.

As shown in FIG. 1, wire W is unconstrained and unsupported between the retaining ring and the top of the hat. Although the conical shape of the hat facilitates in the reduction of tangles of the wire, the wire can become tangled in this region especially when loops of wire prematurely move through the retaining ring. The premature freeing of the loops commonly results in the wire reorienting itself within the region between the retaining ring and the top of the hat and thereby causing a tangle in the wire which typically results in an e-script.

Figure 3:
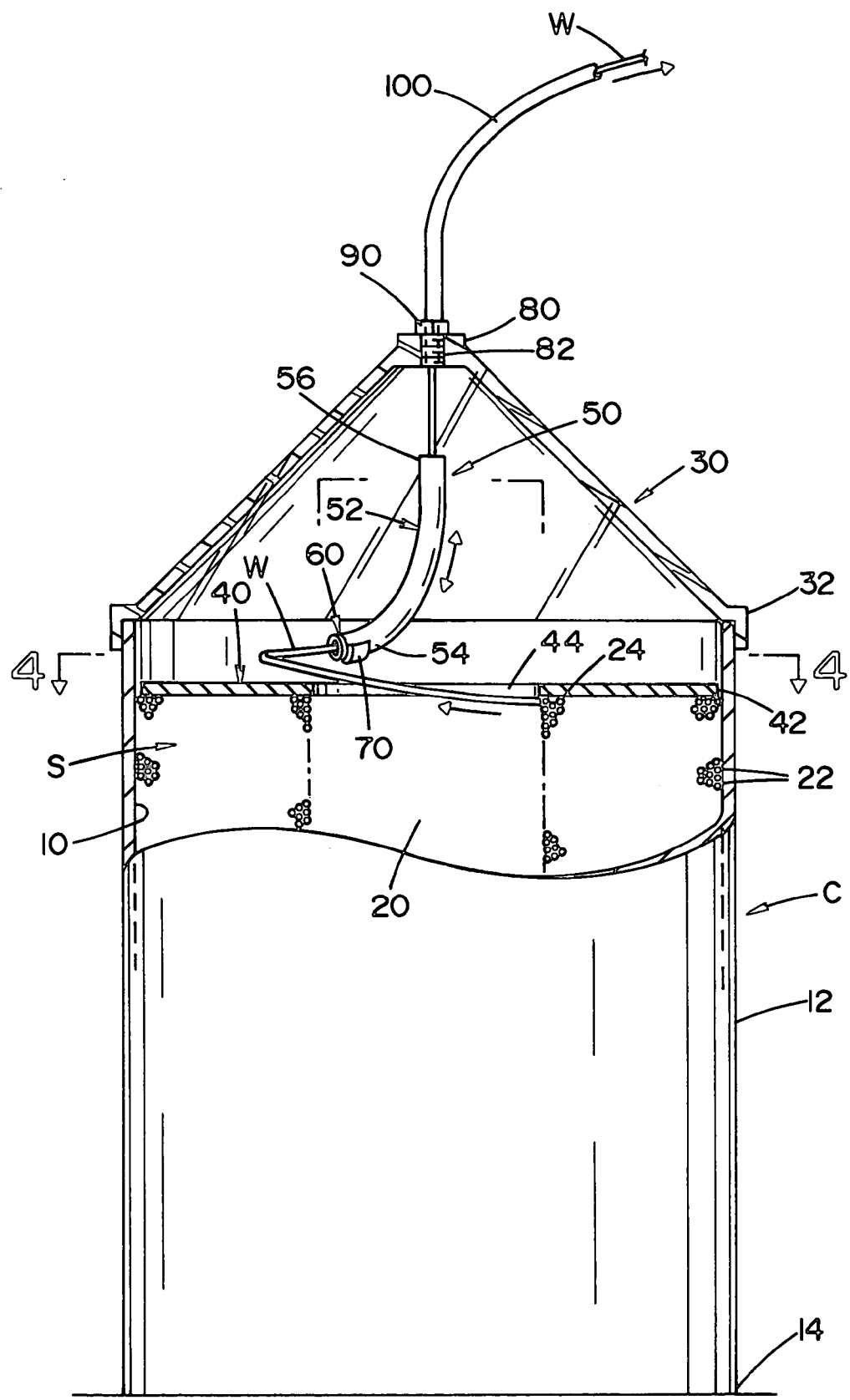
FIG. 3 is a front sectional view of the container of welding wire as illustrated in FIG. 3.
Figure 4:
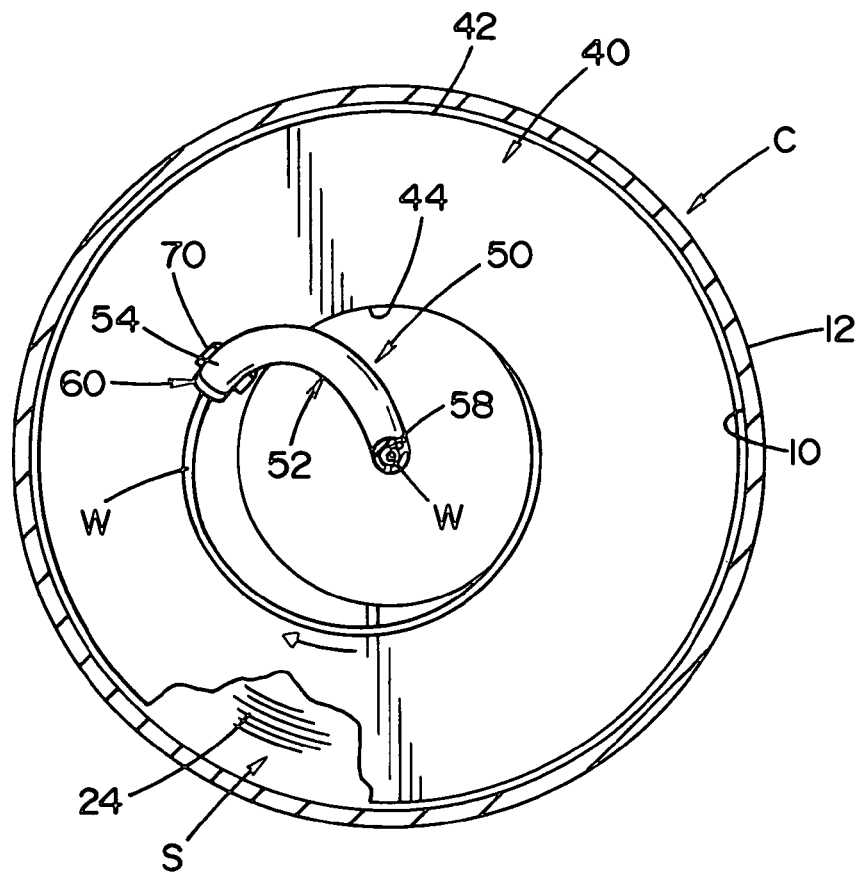
FIG. 4 is a cross-sectional view taken along line 4—4 of FIG. 3.
Figure 5:
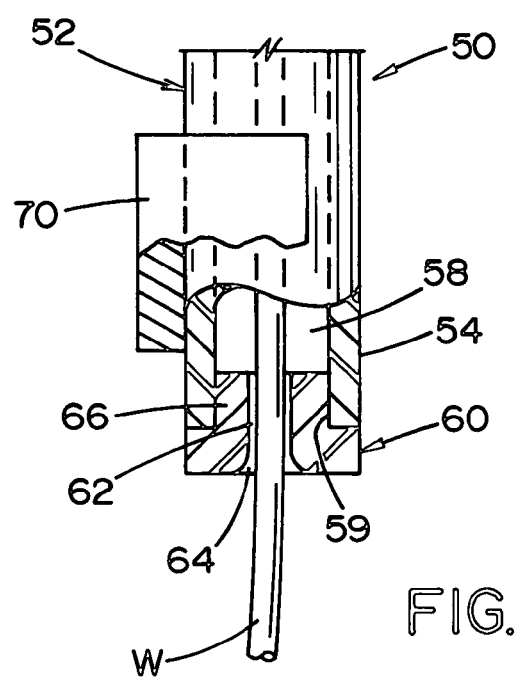
FIG. 5 is a cross-sectional view of the lower end of the floating liner illustrated in FIG. 3.

Referring now to FIGS. 2–7, a floating liner 50 is positioned between the hat top 80 and retaining ring 40. Floating liner 50 includes a flexible tube 52 having a lower end 54, and upper end 56, and a passageway 58 extending between the two ends. As best illustrated in FIG. 5, the opening 59 in lower end 54 of floating liner 50 is designed to receive a sleeve flange 66 of guide sleeve 60. Guide sleeve 60 includes a sleeve opening 62 having a beveled surface 64 which is designed to facilitate in the guiding of welding wire W into the sleeve opening. Guide sleeve 60 is typically secured in opening 59 by a friction connection and/or by adhesive; however, many other connection mechanisms can be used. The surfaces of sleeve opening 62 and beveled surface 64 are typically formed of a low friction material so as not to impair the movement of welding wire W into and through guide sleeve 60. The low friction surfaces of guide sleeve 60 can be obtained by selecting low friction materials used to form the guide sleeve and/or by coating the surfaces with a low friction material. The diameter of sleeve opening 62 is illustrated as being slightly greater than the diameter of welding wire W. Typically the sleeve opening has a minimum diameter of about 1.25–2 times the diameter of the wire; however, other opening diameters can be used. As illustrated in FIG. 5, the diameter of passageway 58 of tube 52 is greater than the diameter of sleeve opening 62. As can be appreciated, the diameter of passageway 58 and the diameter of sleeve opening 62 can be the same. As illustrated in FIG. 7, the diameter of passageway is generally at least about 2–3 times the diameter of the wire. The inner surfaces of passageway 58 are also designed to form a low friction contact with welding wire W as it passes through tube 52. This low friction surface can be obtained by selecting low friction materials for the formation of tube 52 and/or by coating the passageway 58 with low friction materials. Examples of some of the many different types of materials which can be used to form tube 52 include but are not limited to polypropylene, nylon, a mixture of $MoS_2$, nylontron, Teflon coated materials and the like.

Referring again to FIG. 2, floating liner 50 is designed to capture welding wire W shortly after it passes through central opening 44 of retainer ring 40. By the capture of the welding wire W shortly after the welding wire passes through retaining ring 40, the incidence of the welding wire twisting or forming e-scripts are significantly reduced. Once the wire passes into the floating liner, the wire is supported in the liner thereby reducing the ability of the wire to become tangled even when loops of wire prematurely pass above the retaining ring. The size of the sleeve opening 62 and passageway 58 of tube 52 is selected to further limit or prevent the welding wire from twisting or forming an e-script as it passes through the floating liner 50.

Referring again to FIG. 5, a weight 70 is secured to lower end 54 of tube 52. Weight 70 is designed to increase the gravity force on lower end 54 which downward force is equal to or similar to the average upper force being applied to floating liner 50 from frictional forces due to the welding wire passing into guide sleeve 60 and through passageway 58 of tube 52. The balance of the frictional forces to the weight of the floating liner is illustrated in FIG. 6. $W_1$ represents the weight of tube 52 of the floating liner. $W_2$ represents the weight of weight 70. F represents the frictional force asserted on the inner passageway 58 of the floating liner when the wire contacts the inner walls of tube 52 as the wire moves through the floating liner. By selecting the proper size of weight 70, the upward force applied to the floating liner by frictional force F is equally countered by the weight of the floating liner tube $W_1$ and the weight $W_2$ of weight 70. This force and weight balance is represented by $F \approx W_1 + W_2$. By selecting a weight 70 having the proper weight profile, tube 52 exhibits a floating effect on the top surface of retaining ring 40 as shown in FIG. 3. This floating affect results in the lower end 54 of tube 52 moving up and down above the upper surface of retainer ring 40 as wire W is paid out from wire stack or coils S.

As illustrated in FIG. 5, weight 70 is clamped at the lower end 54 and slightly rearwardly of guide sleeve 60. Weight 70 can be releasably or permanently connected to the lower end 54 of tube 52 in a variety of ways. As illustrated in FIGS. 2–6, weight 70 is formed of a single weight connected to lower end 54 of tube 52; however, it can be appreciated that weight 70 can be formed of a plurality of weights positioned at various regions along the longitudinal length of tube 52, integrated into the composition of tube 52, etc. It can further be appreciated that weight 70 can be distributed along the length of the tube by various arrangements such as, but not limited to, the use of a steel rod/strip coiling around a portion of the complete length of the tube.

Figure 2:
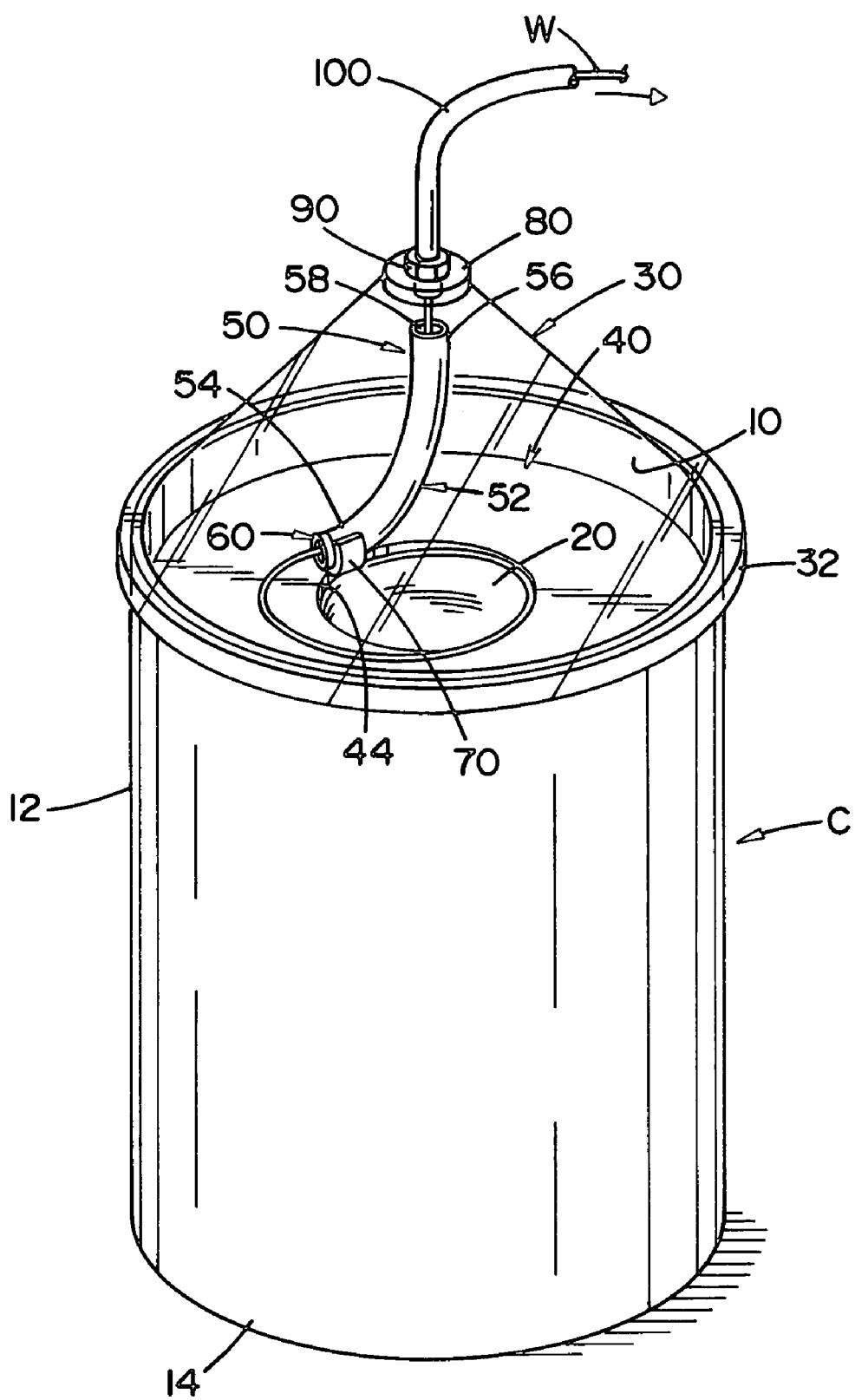
FIG. 2 is an elevation view of a container of welding wire that includes the floating liner of the present invention.

Referring now to FIGS. 2–4, the dispensement of welding wire W from wire stack or coils S in container C is illustrated. As shown in FIG. 2, when welding wire W is initially paid out from container C, retainer ring 40 is positioned close to the top of container C and the lower end 54 of tube 52 of floating liner 50 is positioned near the top surface of retainer ring 40. As welding wire W is paid out from container C, welding wire W begins to become unwound from wire stack or coils S and passes through central opening 44 of retainer ring 40. As the welding wire is fed out from central opening 44 of retainer ring 40, guide sleeve 60 on the lower end of floating liner 50 at least partially follows the circular movement of the welding wire which is exiting central opening 44 resulting in the lower end of tube 52 partially bending due to its flexible construction. The short distance between the point where welding wire W exits central opening 44 of retainer ring 40 and the point where the welding wire enters into sleeve opening 62 of guide sleeve 60 results in a significant reduction in the number of tangles or e-scripts formed in the wire as it is paid out from wire stack or coils S. Such reduction in twists and e-scripts significantly improves the quality of welding especially for automatic or semiautomatic welding. The reduction in tangles or e-scripts formed in the wire is at least partially the result of the floating liner providing rigidity and support to the wire between the retaining ring and the top of the hat. The weight profile of floating liner 50 caused by weight 70 ensures that the lower end 54 of tube 52 floats above the upper surface of retaining ring 40 as the wire is paid out of the container. The floating effect of the lower end of floating liner 50 can also be facilitated by a reduction in the amount of friction resulting from the wire passing through the floating liner. The length of the floating liner is typically selected so as to be more than the straight line distance between the top of the retaining ring and the top of the hat when the container is full of welding wire. As welding wire W is continued to paid out from wire stack or coils S, the volume of wire stack or coils S is depleted, thereby resulting in retainer ring 40 moving downwardly in container C. As retainer ring 40 moves downwardly, the range of movement of the floating liner increases.

At least the lower potion of floating liner 50 is formed of a flexible material to enable the floating liner to at least partially conform into a shape which allows the lower end 54 to continue to float above the top surface of retainer ring 40 as the welding wire is paid out from wire stack or coils S. The flexible composition of the lower portion of floating liner 50 results in the lower portion of the tube 52 to be shaped in the form of a partial helix so as to conform to the wire shape as the wire initially enters the floating liner. This partial helical shape results from the forces applied to the tube 52 by the wire as it travels through floating liner. The flexibility of the lower portion of the floating liner further facilitates in the movement of the welding wire through floating liner 50 so as not to impair the even and smooth flow of the welding wire as its being paid out from container C. As can be appreciated, the upper portion of floating liner 50 can also be formed of a flexible material.

Figure 8:
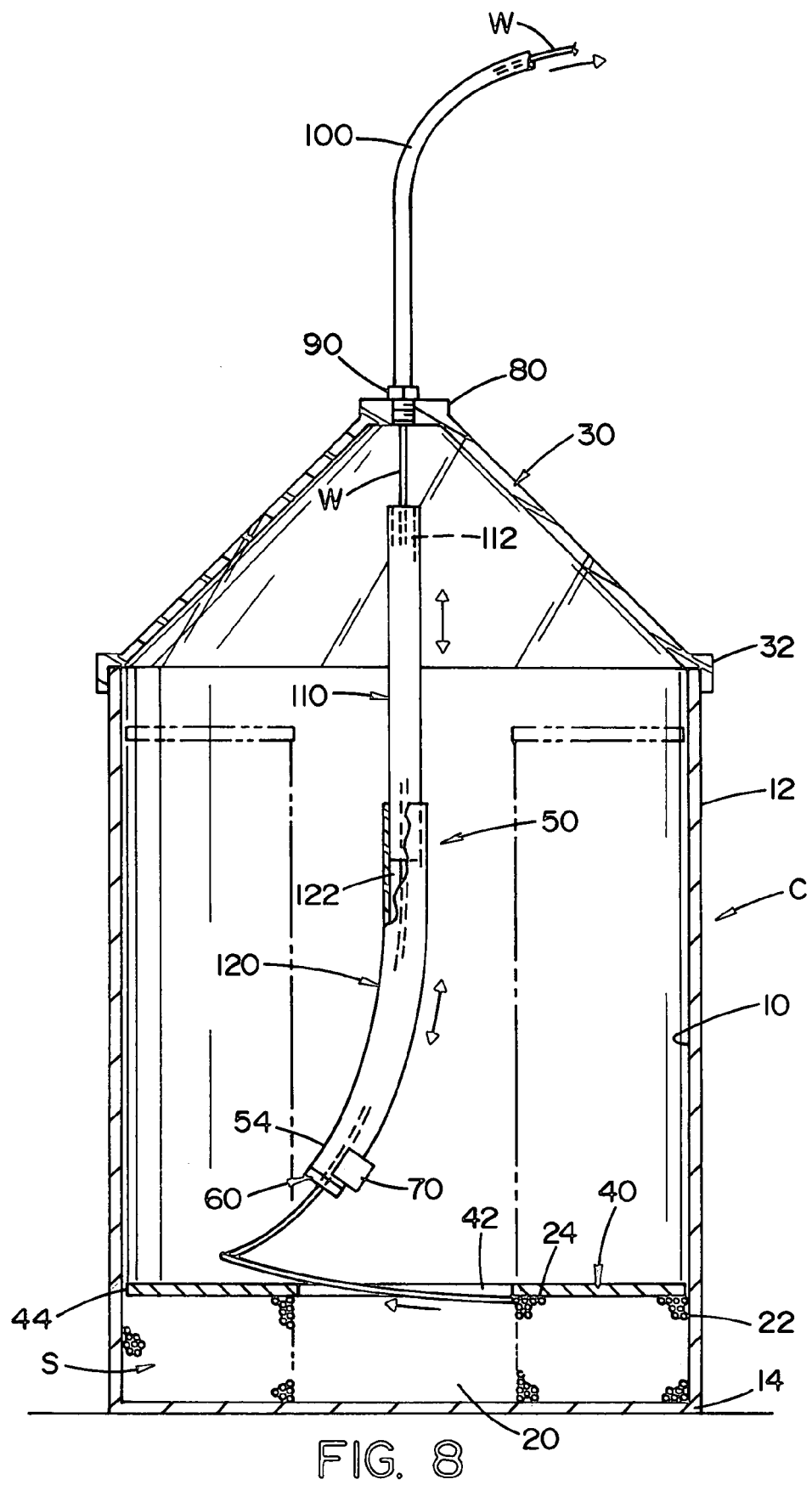

Referring now to FIG. 8, another embodiment of the floating liner is illustrated. Floating liner 50 is illustrated as including a plurality of sleeves formed in the upper portion of the floating liner. The sleeves are designed to allow the lower end of the floating liner to move downwardly into container C as the welding wire is paid out from wire stack or coils S. The sleeves also enable the length of the floating liner to change as the wire is paid out from the container. The upper portion of floating liner 50 includes an inner tube sleeve 110 having an internal passageway 112 and an outer tube sleeve 120 having a passageway 122. Interior tube sleeve 110 has a diameter which is smaller than the diameter of outer tube sleeve 120 such that interior sleeve 110 can be telescopically received in passageway 122 of outer tube sleeve 120. Typically, one or more sections of the floating liner are made of material that facilitates in the proper telescoping of the tube sleeves with respect to one another. As can be appreciated, the tube sections can be made of the same or different materials. The tube sleeves are positioned such that they are generally parallel to the longitudinal axis of container C; however, other orientations can and do occur as the wire is paid out from the container. The plurality of sections of the floating liner facilitates in the extension and retraction of the upper portion of floating liner 50 as lower end 54 of floating liner 50 follows the downward movement of retaining ring 40 during the paying out of welding wire W from wire stack or coils S. When the floating liner includes telescoping sections in the upper portion of the floating liner, the lower portion of the floating liner can be formed of a flexible or nonflexible material.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus defined the invention, We claim:

1. A floating liner adapted for use with a container of welding wire, said floating liner comprising a tube having first and second ends and a passageway extending between the two ends, said first end adapted to receive the welding wire, said passageway designed to receive the welding wire, at least a portion of said tube is at least partially flexible, said tube having a non-uniform weight distribution that causes said first end to at least partially float up and down above a top surface of a layer of welding wire or retainer ring in the container for at least a portion of a time the welding wire is paid out of the container.

2. The floating liner as defined in claim 1, wherein a downward force on said tube resulting from said weight distribution along the length of said tube is about equal to an upward force applied to said tube as the welding wire being paid out of the container passes into and through said passageway of said tube.

3. The floating liner as defined in claim 2, wherein said tube includes at least two sections that are telescopically connected together.

4. The floating liner as defined in claim 2, wherein said passageway of said tube has an inner diameter that is at least twice the diameter of the wire passing through the passageway.

5. The floating liner as defined in claim 1, wherein said tube includes a sleeve secured to said first end, said sleeve including a beveled opening to at least partially guide the welding wire into said passageway of said tube, said beveled opening having a cross-sectional area that is less than a cross sectional area of said passageway.

6. The floating liner as defined in claim 5, wherein said beveled opening at least partially includes a low friction material.

7. The floating liner as defined in claim 1, wherein said passageway of said tube at least partially includes a low friction material, said low friction material having lower friction properties than an outer surface of said tube.

8. The floating liner as defined in claim 7, wherein said low friction material is coated on at least a portion of a surface of said passageway.

9. The floating liner as defined in claim 1, wherein said passageway of said tube has an inner diameter that is at least twice the diameter of the wire passing through the passageway.

10. The floating liner as defined in claim 1, wherein a lower portion of said tube that includes said first end has a generally curved shape.

11. A floating liner adapted for use with a container of welding wire, said floating liner comprising a tube having first and second ends and a passageway extending between the two ends, said first end adapted to receive the welding wire, said passageway designed to receive the welding wire, said tube having a weight distribution that causes said first end to at least partially float up and down above a top surface of a layer of welding wire or retainer ring in the container for at least a portion of a time the welding wire is paid out of the container, said weight distribution of said tube includes the greatest weight at least closely adjacent to said first end of said tube.

12. The floating liner as defined in claim 11, wherein said weight distribution of said tube is adjustable.

13. The floating liner as defined in claim 11, wherein said tube includes at least two sections that are telescopically connected together.

14. The floating liner as defined in claim 11, wherein said passageway of said tube has an inner diameter that is at least twice the diameter of the wire passing through the passageway.

15. A floating liner adapted for use with a container of welding wire, said floating liner comprising a tube having first and second ends and a passageway extending between the two ends, said first end adapted to receive the welding wire, said passageway designed to receive the welding wire, at least a portion of said tube is at least partially flexible, said tube having a weight distribution that causes said first end to at least partially float up and down above a top surface of a layer of welding wire or retainer ring in the container for at least a portion of a time the welding wire is paid out of the container, a downward force on said tube resulting from said weight distribution of said tube is about equal to an upward force applied to said tube as the welding wire being paid out of the container passes into and through said passageway of said tube, said weight distribution of said tube includes the greatest weight at least closely adjacent to said first end of said tube.

16. The floating liner as defined in claim 15, wherein said weight distribution of said tube is adjustable.

17. The floating liner as defined in claim 16, wherein said tube includes a sleeve secured to said first end, said sleeve including a beveled opening to at least partially guide the welding wire into said passageway of said tube, said beveled opening having a cross-sectional area that is less than a cross sectional area of said passageway.

18. The floating liner as defined in claim 17, wherein said tube includes at least two sections that are telescopically connected together.

19. The floating liner as defined in claim 4, wherein said tube includes a sleeve secured to said first end, said sleeve including a beveled opening to at least partially guide the welding wire into said passageway of said tube, said beveled opening having a cross-sectional area that is less than a cross sectional area of said passageway.

20. The floating liner as defined in claim 19, wherein said tube includes at least two sections that are telescopically connected together.

21. The floating liner as defined in claim 15, wherein said tube includes at least two sections that are telescopically connected together.

22. The floating liner as defined in claim 15, wherein said tube includes at least two sections that are telescopically connected together.

23. A floating liner adapted for use with a container of welding wire, said floating liner comprising a tube having first and second ends and a passageway extending between the two ends, said first end adapted to receive the welding wire, said passageway designed to receive the welding wire, said tube having a weight distribution that causes said first end to at least partially float up and down above a top surface of a layer of welding wire or retainer ring in the container for at least a portion of a time the welding wire is paid out of the container, said weight distribution of said tube is adjustable.

24. The floating liner as defined in claim 23, wherein said weight distribution of said tube is at least partially formed by a removable weight.

25. The floating liner as defined in claim 23, wherein said passageway of said tube has an inner diameter that is at least twice the diameter of the wire passing through the passageway.

26. The floating liner as defined in claim 25, wherein a lower portion of said tube that includes said first end has a generally curved shape.

27. A container of welding wire, said container comprising an outer wall having a generally uniform cross-sectional shape, and an upper opening and adapted to contain and allow controlled payout of a multitude of convolutions of welding wire formed into layers defining a generally cylindrical wire stack, said container further including a floating liner to at least partially guide said welding wire as said welding wire travels toward said upper opening of said container, said floating liner including a tube having first and second ends and a passageway extending between the two ends, at least one end of said tubes unconnected from said container, at least a portion of said tube is at least partially flexible, said tube having a non-uniform weight distribution along the length that causes said first end to at least partially float up and down above a top surface of said layers of welding wire at least a portion of a time the welding wire is paid out of said container.

28. The container as defined in claim 27, wherein a downward force on said tube resulting from said weight distribution of said tube is about equal to an upward force applied to said tube as said welding wire being paid out of said container passes into and through said passageway of said tube.

29. The container as defined in claim 28, including a retainer ring positioned on said top surface of said layers of welding wire, said first end to at least partially float at least closely adjacent to a top surface of said retainer ring.

30. The container as defined in claim 28, wherein said passageway of said tube has an inner diameter that is at least twice the diameter of the wire passing through the passageway.

31. The container as defined in claim 27, wherein said tube includes a sleeve secured to said first end, said sleeve including a beveled opening to at least partially guide said welding wire into said passageway of said tube, said beveled opening having a cross-sectional area that is less than a cross sectional area of said passageway.

32. The container as defined in claim 31, wherein said beveled opening at least partially includes a low friction material.

33. The container as defined in claim 27, wherein said passageway of said tube at least partially includes a low friction material, said low friction material having lower friction properties than an outer surface of said tube.

34. The container as defined in claim 33, wherein said low friction material is coated on at least a portion of a surface of said passageway.

35. The container as defined in claim 27, wherein a lower portion of said tube that includes said first end has a generally curved shape.

36. The container as defined in claim 27, wherein said cross-sectional shape of said container is substantially circular.

37. The container as defined in claim 27, including a retainer ring positioned on said top surface of said layers of welding wire, said first end to at least partially float at least closely adjacent to a top surface of said retainer ring.

38. The container as defined in claim 27, wherein said passageway of said tube has an inner diameter that is at least twice the diameter of the wire passing through the passageway.

39. The container as defined in claim 27, wherein said tube is at least partially formed of a material selected from the group consisting of a plastic polymer, nylon, Teflon, spring shaped steel, and combinations thereof.

40. A container of welding wire, said container comprising an outer wall having a generally uniform cross-sectional shape, and an upper opening and adapted to contain and allow controlled payout of a multitude of convolutions of welding wire formed into layers defining a generally cylindrical wire stack, said container further including a floating liner to at least partially guide said welding wire as said welding wire travels toward said upper opening of said container, said floating liner including a tube having first and second ends and a passageway extending between the two ends, at least one end of said tubes unconnected from said container, said tube having a weight distribution that causes said first end to at least partially float up and down above a top surface of said layers of welding wire at least a portion of a time the welding wire is paid out of said container, said weight distribution of said tube includes the greatest weight at least closely adjacent to said first end of said tube.

41. The container as defined in claim 40, wherein said tube includes at least two sections that are telescopically connected together.

42. The container as defined in claim 41, wherein said second end of said tube includes a substantially rigid portion that is oriented substantially parallel to a longitudinal axis of said container.

43. The container as defined in claim 41, wherein said second end of said tube includes a plurality of substantially rigid sections that are connected to one another and wherein at least one section at least partially telescopically receives another section.

44. The container as defined in claim 40, wherein said passageway of said tube has an inner diameter that is at least twice the diameter of the wire passing through the passageway.

45. A container of welding wire, said container comprising an outer wall having a generally uniform cross-sectional shape, and an upper opening and adapted to contain and allow controlled payout of a multitude of convolutions of welding wire formed into layers defining a generally cylindrical wire stack, said container further including a floating liner to at least partially guide said welding wire as said welding wire travels toward said upper opening of said container, said floating liner including a tube having first and second ends and a passageway extending between the two ends, at least one end of said tubes unconnected from said container, at least a portion of said tube is at least partially flexible, said tube having a weight distribution that causes said first end to at least partially float up and down above a top surface of said layers of welding wire at least a portion of a time the welding wire is paid out of said container, a downward force on said tube resulting from said weight distribution of said tube is about equal to an upward force applied to said tube as said welding wire being paid out of said container passes into and through said passageway of said tube, said weight distribution of said tube includes the greatest weight at least closely adjacent to said first end of said tube.

46. The container as defined in claim 45, wherein said tube includes a sleeve secured to said first end, said sleeve including a beveled opening to at least partially guide said welding wire into said passageway of said tube, said beveled opening having a cross-sectional area that is less than a cross sectional area of said passageway.

47. The container as defined in claim 46, wherein said tube includes at least two sections that are telescopically connected together.

48. The container as defined in claim 47, wherein said second end of said tube includes a plurality of substantially rigid sections that are connected to one another and wherein at least one section at least partially telescopically receives another section.

49. The container as defined in claim 45, wherein said tube includes at least two sections that are telescopically connected together.

50. The container as defined in claim 49, wherein said second end of said tube includes a plurality of substantially rigid sections that are connected to one another and wherein at least one section at least partially telescopically receives another section.

51. The container as defined in claim 50, wherein a lower portion of said tube that includes said first end has a generally curved shape.

52. The container as defined in claim 51, wherein said cross-sectional shape of said container is substantially circular.

53. The container as defined in claim 52, including a retainer ring positioned on said top surface of said layers of welding wire, said first end to at least partially float at least closely adjacent to a top surface of said retainer ring.

54. The container as defined in claim 50, including a retainer ring positioned on said top surface of said layers of welding wire, said first end to at least partially float at least closely adjacent to a top surface of said retainer ring.

55. A container of welding wire, said container comprising an outer wall having a generally uniform cross-sectional shape, and an upper opening and adapted to contain and allow controlled payout of a multitude of convolutions of welding wire formed into layers defining a generally cylindrical wire stack, said container further including a floating liner to at least partially guide said welding wire as said welding wire travels toward said upper opening of said container, said floating liner including a tube having first and second ends and a passageway extending between the two ends, at least one end of said tubes unconnected from said container, said tube having a weight distribution that causes said first end to at least partially float up and down above a top surface of said layers of welding wire at least a portion of a time the welding wire is paid out of said container, said weight distribution of said tube is adjustable.

56. The container as defined in claim 55, wherein said weight distribution of said tube is at least partially formed by a removable weight.

57. The container as defined in claim 55, wherein said passageway of said tube has an inner diameter that is at least twice the diameter of the wire passing through the passageway.

58. A method of controlling the dispensing of wire from a container to reduce incidence of tangling of the welding wire and the formation of e-scripts in the welding wire as the welding wire is paid out from the container comprising:
providing a container having an outer wall having a generally uniform cross-sectional shape, and an upper opening, and adapted to contain and allow controlled payout of welding wire;
providing a stack of welding wire in said container, said stack of welding wire having a multitude of convolutions of welding wire formed into layers defining a generally cylindrical stack of welding wire; and,
providing a floating liner to at least partially guide said welding wire as said welding wire is paid out of said container, said floating liner including a tube having first and second ends and a passageway extending between the two ends, at least one end of said tube being unconnected from said container, at least a portion of said tube is at least partially flexible, said tube having a non-uniform weight distribution along the length that causes said first end to at least partially float up and down above a top surface of said layers of welding wire at least a portion of a time the welding wire is paid out of said container.

59. The method as defined in claim 58, including the step of positioning a retainer ring on said top surface of said layers of welding wire, said first end to at least partially float above a top surface of said retainer ring.

60. The method as defined in claim 58, including the step of selecting a tube having a weight distribution to create a downward force that is about equal to an upward force that is applied to said tube as said welding wire is being paid out of said container passes into and through said passageway of said tube.

61. The method as defined in claim 58, wherein said tube includes a sleeve secured to said first end, said sleeve including a beveled opening to at least partially guide said welding wire into said passageway of said tube, said beveled opening having a cross-sectional area that is less than a cross sectional area of said passageway.

62. The method as defined in claim 61, wherein said beveled opening at least partially includes a low friction material.

63. The method as defined in claim 62, wherein said low friction material coated on at least a portion of a surface of said passageway, said low friction material having lower friction properties than an outer surface of said tube.

64. The method as defined in claim 58, wherein said tube includes at least two sections that are telescopically connected together.

65. The method as defined in claim 58, wherein said cross-sectional shape of said container is substantially circular.

66. The method as defined in claim 58, including the step of providing a retainer ring positioned on said top surface of said layers of welding wire, said first end of said tube to at least partially float at least closely adjacent to a top surface of said retainer ring.

67. The method as defined in claim 58, wherein said passageway of said tube has an inner diameter that is at least twice the diameter of the wire passing through the passageway.

68. The method as defined in claim 58, wherein said tube is at least partially formed of a material selected from the group consisting of a plastic polymer, nylon, Teflon, spring shaped steel, and combinations thereof.

69. The method as defined in claim 58, wherein said tube includes a lower portion, said lower portion of said tube being generally curved shape.

70. A method of controlling the dispensing of wire from a container to reduce incidence of tangling of the welding wire and the formation of e-scripts in the welding wire as the welding wire is paid out from the container comprising:

providing a container having an outer wall having a generally uniform cross-sectional shape, and an upper opening, and adapted to contain and allow controlled payout of welding wire;

providing a stack of welding wire in said container, said stack of welding wire having a multitude of convolutions of welding wire formed into layers defining a generally cylindrical stack of welding wire; and, providing a floating liner to at least partially guide said welding wire as said welding wire is paid out of said container, said floating liner including a tube having first and second ends and a passageway extending between the two ends, at least one end of said tube being unconnected from said container, said tube having a weight distribution that causes said first end to at least partially float up and down above a top surface of said layers of welding wire at least a portion of a time the welding wire is paid out of said container, said weight distribution of said tube includes the greatest weight at least closely adjacent to said first end of said tube.

71. A method of controlling the dispensing of wire from a container to reduce incidence of tangling of the welding wire and the formation of e-scripts in the welding wire as the welding wire is paid out from the container comprising:

providing a container having an outer wall having a generally uniform cross-sectional shape, and an upper opening, and adapted to contain and allow controlled payout of welding wire;

providing a stack of welding wire in said container, said stack of welding wire having a multitude of convolutions of welding wire formed into layers defining a generally cylindrical stack of welding wire; and, providing a floating liner to at least partially guide said welding wire as said welding wire is paid out of said container, said floating liner including a tube having first and second ends and a passageway extending between the two ends, at least one end of said tube being unconnected from said container, said tube having a weight distribution that causes said first end to at least partially float up and down above a top surface of said layers of welding wire at least a portion of a time the welding wire is paid out of said container, said weight distribution of said tube is adjustable.

72. A method of controlling the dispensing of wire from a container to reduce incidence of tangling of the welding wire and the formation of e-scripts in the welding wire as the welding wire is paid out from the container comprising:

providing a container having an outer wall having a generally uniform cross-sectional shape, and an upper opening, and adapted to contain and allow controlled payout of welding wire;

providing a stack of welding wire in said container, said stack of welding wire having a multitude of convolutions of welding wire formed into layers defining a generally cylindrical stack of welding wire; and, providing a floating liner to at least partially guide said welding wire as said welding wire is paid out of said container, said floating liner including a tube having first and second ends and a passageway extending between the two ends, at least one end of said tube being unconnected from said container, said tube having a weight distribution that causes said first end to at least partially float up and down above a top surface of said layers of welding wire at least a portion of a time the welding wire is paid out of said container, said weight distribution of said tube is at least partially formed by a removable weight.

* * * * *